United States Patent [19]

Rau et al.

[11] 4,214,634
[45] Jul. 29, 1980

[54] ARRANGEMENT FOR COUPLING A CULTIVATING ATTACHMENT TO A CULTIVATING MACHINE

[75] Inventors: Willy Rau, Weilheim; Christian Taus, Kirchheim, both of Fed. Rep. of Germany

[73] Assignee: Maschinenfabrik Rau GmbH, Weilheim, Fed. Rep. of Germany

[21] Appl. No.: 942,894

[22] Filed: Sep. 13, 1978

[30] Foreign Application Priority Data

Sep. 15, 1977 [DE] Fed. Rep. of Germany ... 7728517[U]

[51] Int. Cl.² .............................................. A01B 23/04
[52] U.S. Cl. ..................................... 172/179; 172/396; 172/678; 280/474
[58] Field of Search ............... 172/324, 326, 478, 323, 172/396, 467, 572, 677–680, 179, 175; 280/474

[56] References Cited

U.S. PATENT DOCUMENTS

| | | | |
|---|---|---|---|
| 1,574,351 | 2/1926 | Altgelt | 280/474 |
| 2,209,478 | 7/1940 | Selhorst | 172/179 X |
| 2,438,032 | 3/1948 | Bready | 280/474 X |
| 4,091,878 | 5/1978 | Steketee | 172/147 |

*Primary Examiner*—Richard J. Johnson
*Attorney, Agent, or Firm*—Michael J. Striker

[57] ABSTRACT

An arrangement for coupling a cultivating attachment to a cultivating machine has a spring-suspended support articulately coupling a respective roller unit of the attachment to a main frame of the machine. The support includes elements for adjusting the relative elevation of the main frame and the roller unit while permitting relative vertical movement between the same. The support includes spring element opposing such relative movement with shock-absorbing action. A blocking element is provided cooperating with the spring-suspension support and movable between a blocking setting preventing the above-mentioned relative movement and an unblocking setting not preventing such limited movement.

15 Claims, 3 Drawing Figures

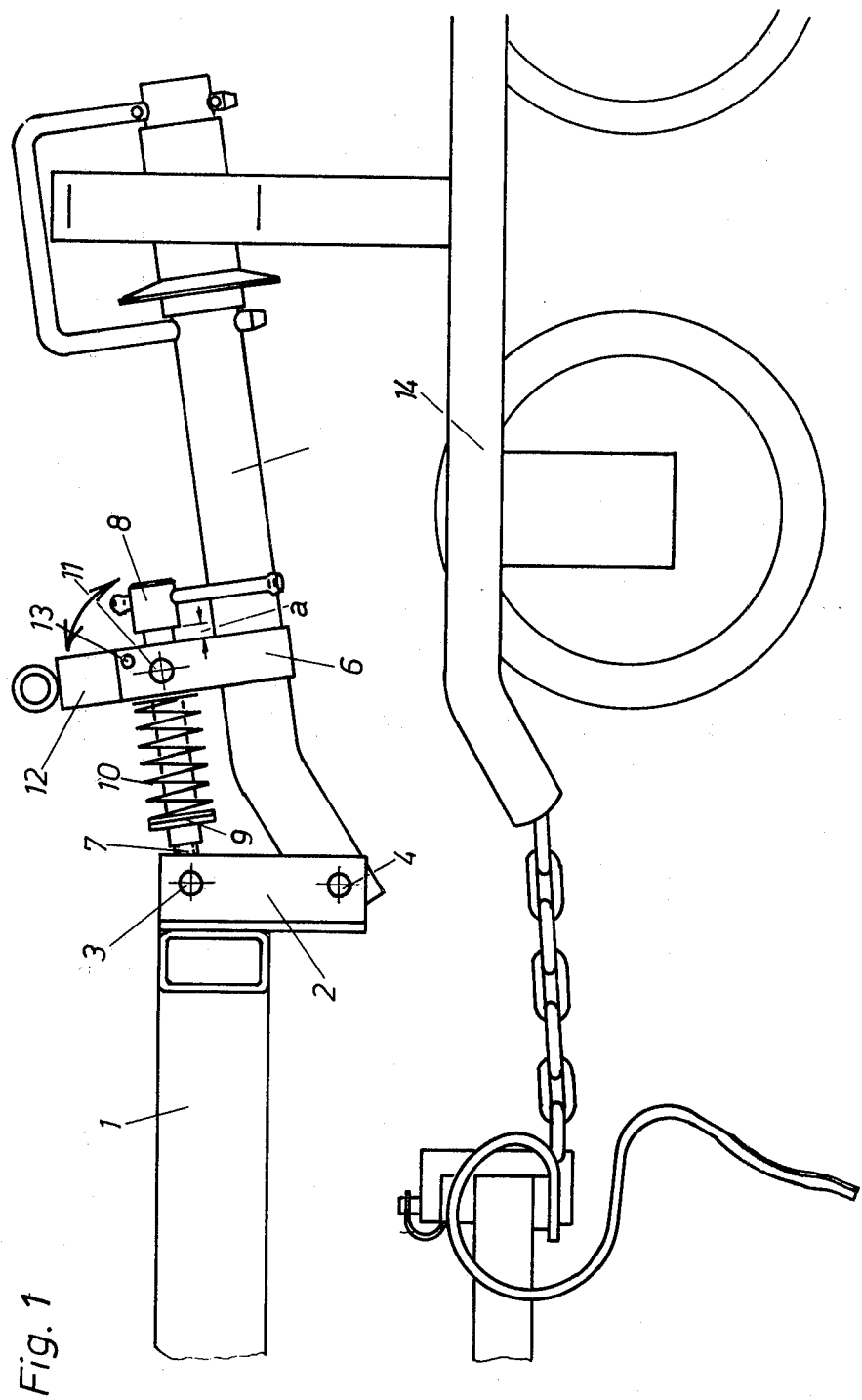

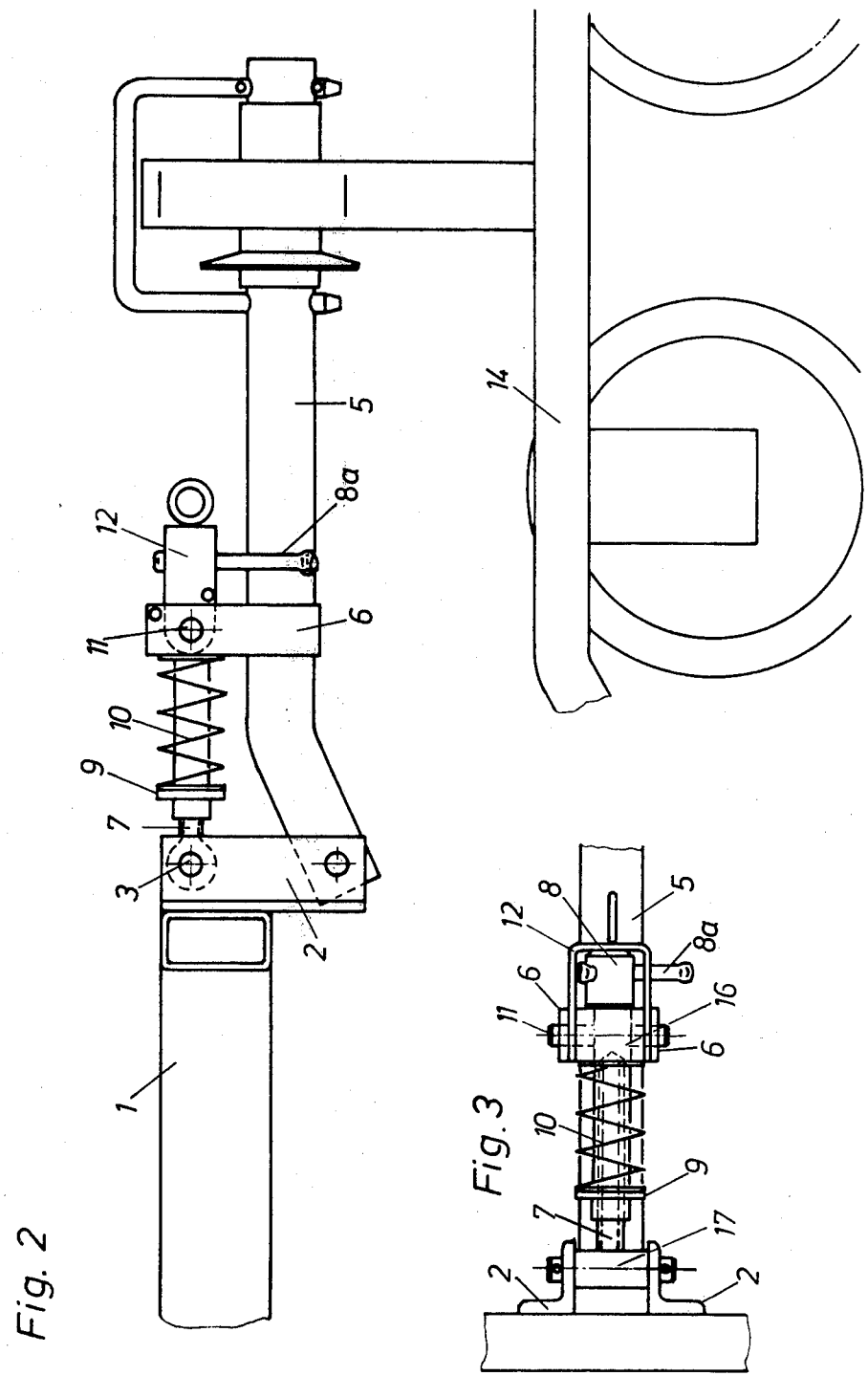

ARRANGEMENT FOR COUPLING A CULTIVATING ATTACHMENT TO A CULTIVATING MACHINE

BACKGROUND OF THE INVENTION

The present invention relates to a cultivating machine, and more particularly to an arrangement for coupling a cultivating machine.

With tractor-drawn combined-attachment cultivating machines, a main frame adapted to be fitted with cultivating implements, such as harrows or the like, is supported at its trailing ends on one or more roller units which trail the main frame. Each of the one or more roller units is articulately coupled to the trailing end of the main frame by means of a respective support and pressure-transmitting arm, and the coupling arrangement for each roller unit is typically provided with a screw-spindle-type adjuster for adjusting the relative elevations of the frame of the roller unit and of the main frame carrying the cultivating implements. This relative-height adjustment serves to determine the depth of penetration of the cultivating implements into the soil being tilled, because the trailing end of the main frame rests on the trailing roller unit (s).

When the threaded spindle rigidly couples the roller frames to the main frame of the machine the working depth after once being set remains invariable even in conditions of differing ground resistance. In such a construction one has to accept the fact that the individual roller units may not be able to individually rise and descend to match transverse unevenness of the ground being worked and the earth left behind the roller units will be nonuniformly worked. Furthermore, when the arrangement having the above-mentioned rigid coupling passes over obstacles, such as stones and the like, significant stresses are applied to the cultivating implements and the frames because the entire weight of the attachments displaces upwardly under the action of the obstacle.

In order to eliminate these disadvantages, it has been proposed to provide such height-adjustment spindle with shock-absorbing spring-suspension means. Such a construction possesses the disadvantage that the depth of the tool cultivating implements on the main frame no longer remains constant. Thus, the operator is forced to give preference to either rigid or else spring-suspension coupling in dependence upon the implements required and the work to be done. This results from the fact the the known cultivating machines are provided either with a rigid adjusting spindle or else with a shock-absorbing spring-suspension adjusting spindle.

SUMMARY OF THE INVENTION

Accordingly, it is an object of the present invention to provide a cultivating machine, and more particularly an arrangement for coupling cultivating attachments to a cultivating machine, which avoids the disadvantages of the prior art.

More particularly, it is an object of the present invention to provide an arrangement for coupling a cultivating attachment to a cultivating machine, which makes possible to couple the same selectively either rigidly or in shock-absorbing manner.

In keeping with these objects and with others which will become apparent hereinafter one feature of the present invention resides, briefly stated, in that means is provided cooperating with means for coupling one or more roller units to the main or implement-carrying frame of a cultivating machine, and movable between a blocking setting which prevents limited relative movement of the roller-unit(s) and the main frame of the cultivating machine and unblocking setting not preventing such limited movement.

In such a construction, the roller unit(s) in the blocking setting of the cooperating means becomes rigidly connected to the main frame of the machine, whereas in the unblocking setting of the cooperating means the roller unit(s) become movable relative to the main frame of the machine in which latter case the spring means opposes relative movement of the same with shock-absorbing action.

In accordance with another feature of the present invention adjusting means provided in the arrangement may include a threaded spindle and a threaded sleeve meshing with one another and each connected to a respective one of the elements to be coupled, that is to the main frame of the machine or to an arm which supports a roller unit. A connecting member may be provided for articulately connecting the threaded sleeve to the other element and guiding the threaded spindle to one of these elements. On the other hand, a guiding member may be provided for connecting the threaded sleeve during its displacement. The connecting member may be formed as a boss, whereas the guiding member may be formed as a bush.

Still another feature of the present invention is that the cooperating means may include a blocking element which is pivotally connected with the guiding member and movable between the blocking and unblocking settings. The blocking member may be pivotally mounted on an axle which connects the guiding member of the adjusting means to the above-mentioned other element.

A further feature of the present invention is that the blocking member is formed as a U-shaped bracket whose leg portions are pivotally mounted on the axle and whose connecting portion overlaps a front face of the threaded sleeve in the blocking setting, whereby the threaded sleeve cannot displace relative to the guiding element and the roller unit becomes rigidly connected to the main frame of the machine.

Still a further feature of the present invention is that retaining means is provided for retaining the blocking member in each of its positions corresponding to the above-mentioned blocking and unblocking settings. The retaining means includes an opening which is formed in a member supporting the guiding member, and an insert insertable into the opening of the supporting member. The opening is so located that when the insert is inserted therein in one of the settings of the blocking member the latter is prevented from movement to the other setting.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a side view of an arrangement for coupling together a roller and the main or implement-carrying frame of a cultivating machine with spring-suspension action;

FIG. 2 is a side view of the coupling arrangement shown in FIG. 1, but changed over to the rigid-coupling mode.

FIG. 3 is a fragmentary plan view of FIG. 2.

DESCRIPTION OF A PREFERRED EMBODIMENT

The drawing depicts an arrangement for coupling together the main or implement-carrying frame and one trailing roller unit of a combined cultivating machine, wherein reference numeral 1 identifies the main frame of the machine and reference numeral 14 the frame of a roller unit. A pair of shackles 2 is connected to a transverse beam of the main frame 1. The shackles have upper openings 3 and lower openings 4.

An arm 5 is provided for supporting the frame 14 of the roller unit and transmitting pressure. The arm 5 is articulately connected with the shackles 2, for instance, by a pin inserted in the lower openings 4 of the shackles 2. Two additional shackles 6 are welded to the arm 5 at both sides thereof. The arrangement includes a threaded spindle 7 which has a boss 17 articulately connected with the shackles 2 by means of engagement of the boss 17 with the upper openings 3 of the shackles 2. A threaded sleeve 8 meshes with the threaded spindle 7 and has a displaceable handle 8a. Adjustment of the heights of the main frame 1 of the cultivating machine and the trailing roller unit(s) 14 can be performed by displacement of the threaded sleeve 8 relative to the threaded spindle 7.

The threaded sleeve 8 has a spring plate 9 and is guided in its displacement in a bush 16 having transverse pins 11. A spring 10 is located between the spring plate 9 and the bush 16 with prestress. A U-shaped bracket 12 is pivotally mounted on the pins 11 of the bush 16. The bush 16, in turn, is mounted on the shackles 6. Finally, the shackles 6 have openings 13 in which a non-illustrated insert detachably engages.

In FIG. 1 the arrangement is shown in the condition in which the main frame 1 is coupled with the frame 14 of the roller unit in a spring-suspended or shock-absorbing manner. The U-shaped bracket 12 is located in an upright position. The arm 5 is lifted against the action of the spring 10 so that the latter is compressed by the amount "a". The threaded sleeve 8 can unimpededly displace relative to the bush 16 during relative movement of the main frame 1 of the cultivating machine and the frames 14 of the roller unit.

As shown in FIG. 2 and particularly in FIG. 3, when the U-shaped bracket 12 turns about the pins 11 it overlaps the front face of the threaded sleeve 8 and prevents it from displacement relative to the bush 16, whereby the main frame 1 of the cultivating machine becomes rigidly connected with the frame 14 of the roller unit.

When the non-illustrated insert is inserted into the opening 13 of the shackle 6, with the U-shaped 12 in one or other of its two positions, the latter cannot be turned to the other position, whereby unintentional conversion of the arrangement from rigid coupling to spring-suspension coupling, and vice versa, is prevented.

It will be understood that each of the elements described above, or two or more together, may also find a useful application in other types of constructions differing from the types described above.

While the invention has been illustrated and described as embodied in an arrangement for coupling a cultivating attachment to a cultivating machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a tractor-drawn cultivating machine having a main frame adapted to be fitted with leading cultivating implements and at least one roller unit trailing the main frame and the cultivating implements, in combination at least one spring suspension support means articulately coupling a respective roller unit to the main frame of the cultivating machine, including means for adjusting the relative elevations of the main frame and the roller unit of the cultivating machine while permitting limited relative vertical movement between the same, and spring means opposing such relative movement with shock-absorbing action; and means cooperating with said spring-suspension support means and movable between a blocking setting preventing said limited relative movement and an unblocking setting not preventing such limited relative movement.

2. A cultivating machine as defined in claim 1, the roller unit having a support and pressure arm, said spring-suspension support means articulately coupling said arm to the main frame, said spring means being located between said arm and the main frame.

3. A cultivating machine as defined in claim 2, wherein the main frame of the cultivating machine forms a first element and said arm of said roller unit forms a second element, said adjusting means including a threaded spindle and a threaded sleeve meshing with said threaded spindle, said threaded spindle being articulately connected to one of said elements and said threaded sleeve being connected to the other element.

4. A cultivating machine as defined in claim 1, wherein the machine comprises a plurality of such roller units trailing the main frame; and further comprising a plurality of such spring suspension support means each articulately coupling a respective roller unit to the main frame and including means for adjusting the relative elevations of the main frame and a respective roller unit while permitting relative vertical movement between the same and spring means opposing such relative movement with shock-absorbing action, and means cooperating with each of said spring suspension support means and movable between a blocking setting preventing such limited relative movement and an unblocking setting not preventing such limited relative movement of a respective roller unit and the main frame.

5. In a tractor-drawn cultivating machine having a main frame adapted to be fitted with cultivating implements and at least one roller unit trailing the main frame and having a support and a pressure arm, in combination at least one spring suspension support means articulately coupling the pressure arm of a respective roller unit to the main frame, including means for adjusting the relative elevations of the main frame and roller unit while permitting limited relative vertical movement between the same, and spring means located between the pressure arm and the main frame and opposing such relative movement with shock-absorbing action, the main frame of the cultivating machine forming a first element and said arm of said roller unit forming a second element, said adjusting means including a threaded spindle and a threaded sleeve meshing with said threaded spindle, said threaded spindle being articulately connected to one of said elements and said threaded sleeve being connected to the other element, said adjusting means further including a connecting member arranged for articulately connected said threaded spindle to said one element; and means cooperating with said spring-suspension support means and movable between a blocking setting preventing said limited relative movement and an unblocking setting not preventing such limited relative movement.

6. A cultivating machine as defined in claim 5, wherein said adjusting means further includes a guiding member articulately connected with the other element, said threaded sleeve being supported in said guiding member and displaceable relative to the same, said spring means being arranged so as to oppose such displacement of said threaded sleeve with shock-absorbing action.

7. A cultivating machine as defined in claim 5, wherein said guiding member is a bush.

8. A cultivating machine as defined in claim 5, wherein said means cooperating with said support means and movable between settings includes a blocking member which is pivotally connected with said guiding member and movable between said blocking and unblocking settings.

9. A cultivating machine as defined in claim 8, wherein said adjusting means further comprises an axle element which connects said guiding member with said other element, said blocking member being pivotally mounted on said axle element.

10. A cultivating machine as defined in claim 9, wherein said blocking element is a U-shaped bracket which is pivotal between a first position corresponding to said blocking setting and a second position corresponding to said unblocking setting.

11. A cultivating machine as defined in claim 10, wherein said bracket has two leg portions and a connecting portion which connects said leg portions with one another, said axle element being formed by two coaxial pins, each of said leg portions being pivotally mounted on a respective one of said pins of said axle.

12. A cultivating machine as defined in claim 11, wherein said threaded sleeve has a front face, said connecting portion of said bracket being arranged so that in said first position it overlaps said front face of said threaded sleeve and prevents the latter from displacement.

13. A cultivating machine as defined in claim 8; and further comprising a supporting member arranged for connecting said guiding member and thereby said blocking member to said other element, and means cooperating with said supporting member and retaining said blocking member in each of said settings.

14. A cultivating machine as defined in claim 13, wherein said retaining means includes an opening formed in said supporting member and an insert engageable in said opening, said opening being arranged so that when said insert engages in said opening in one of said settings of said blocking member the latter is prevented from movement to the other setting.

15. A cultivating machine as defined in claim 5, wherein said connecting member is a supporting boss.

* * * * *